United States Patent Office.

CHARLES A. SEELY AND CHARLES J. EAMES, OF NEW YORK, N. Y.

Letters Patent No. 74,608, dated February 18, 1868.

IMPROVED DISINFECTING-COMPOUND.

The Schedule referred to in these Letters Patent and making part of the same.

TO ALL WHOM IT MAY CONCERN:

Be it known that we, CHARLES A. SEELY and CHARLES J. EAMES, of New York, in the county of New York, in the State of New York, have invented a new and improved Disinfecting-Compound; and we do hereby declare that the following is a full and exact description thereof, reference being had to the accompanying samples.

The object of our invention is to obtain the useful and well-known disinfecting properties of carbolic and cresylic acids in a more convenient and effective form than the ordinary liquid acids.

To this end we add the liquid acids to certain dry powders which absorb the acids, without having any chemical effect upon them. The so-treated powders therefore serve as reservoirs of the virtues of the acids. Of the powdered or granulated substances which we find most adapted to our purpose, we prefer saw-dust, bran, sand, pulverized charcoal or other coal, whiting, common salt, and other saline substances. Besides these, mixtures of many other equivalent substances might be named, it being understood that any matter in the form of grains or powder, which has no chemical reaction with the disinfecting-acids, is comprehended in our invention, and is available for our purpose.

We are aware that the disinfecting-acids have been used in combination with lime, and with sulphites of lime and magnesia. But in these cases the acids are restrained by reason of affinity for the bases; and moreover, we find the use of lime and other strongly-alkaline matter positively injurious in many cases where disinfectants are needed. Lime sets free ammonia and other offensive gases from nitrogenous substances.

Our invention, then, simply is a mixture of disinfectant acids, with such matter, in the form of powder or grains, which will have no effect upon the acids themselves. As to the proportions of acids to powder, the operator may easily use his discretion, having in view the specific object to be attained, the cost of the mixture, &c. It is obvious that so much acid as would take away the powdery or granular character of the mixture should not be used. As an example of a good mixture for ordinary purposes, we suggest ten pounds saw-dust with forty ounces of carbolic acid.

We have named above carbolic and cresylic acids, but we do not limit ourselves to the use of these in their pure state. On the other hand, we use them in their crude state. Thus we find that the ordinary dead oil of coal-tar contains sufficient of these acids to give it their disinfecting properties, and we find a mixture of the dead oil with neutral powders to be a valuable and cheap disinfectant.

What we claim, and desire to secure by Letters Patent, is—

The disinfecting-compound as above described.

CHARLES A. SEELY,
CHARLES J. EAMES.

Witnesses:
WM. R. TAYLOR,
A. R. RODGERS.